July 27, 1926.
H. L. STRONGSON
CABLE CONNECTER
Filed Oct. 18, 1923
1,594,221
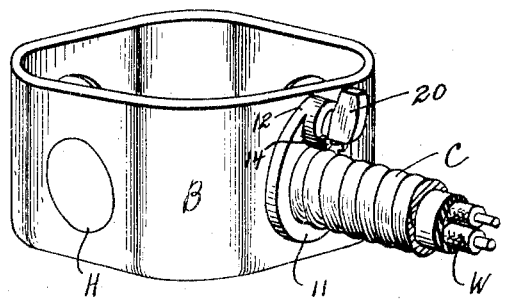
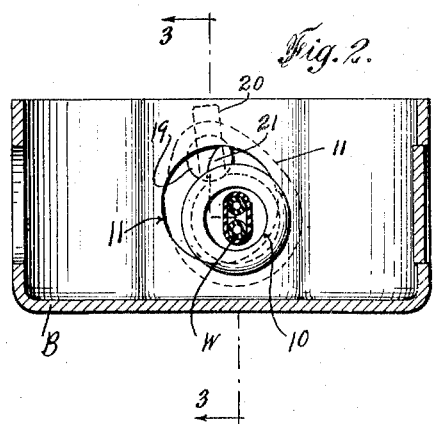
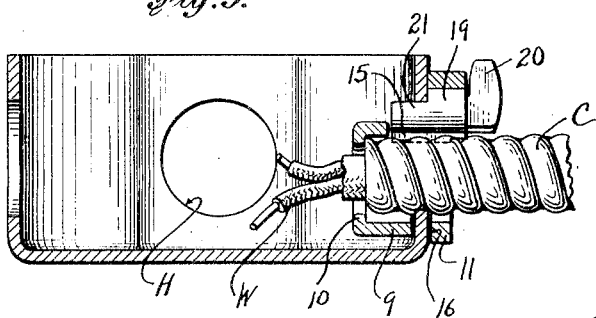
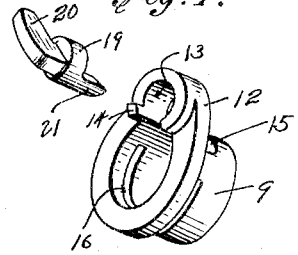
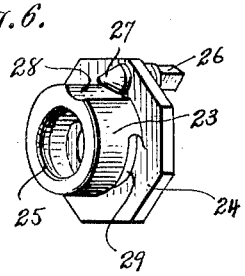
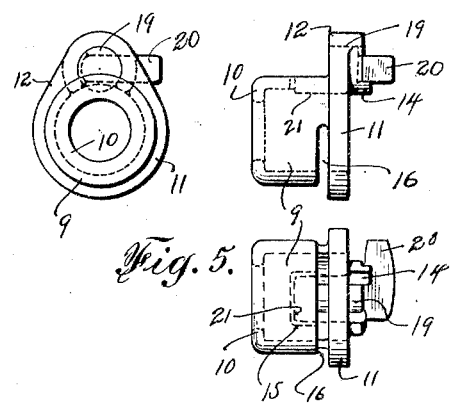
Inventor
Herman L. Strongson
By Attorneys Patented July 27, 1926.

1,594,221

UNITED STATES PATENT OFFICE.

HERMAN L. STRONGSON, OF BROOKLYN, NEW YORK, ASSIGNOR TO THE THOMAS & BETTS CO., OF ELIZABETH, NEW JERSEY, A CORPORATION OF NEW JERSEY.

CABLE CONNECTER.

Application filed October 18, 1923. Serial No. 669,201.

This invention relates to cable connecters for use in anchoring electric cables or conduits to electric box fixtures, such as outlet boxes, switch boxes, cable boxes and the like; and is an improvement over my application Serial Number 604,677, filed December 4, 1922, in that I employ a screw or other rotatable member mounted in the connecter to simultaneously perform the double function of anchoring the connecter in the box hole and fixing the cable in the box hole.

An object of the invention is to produce an improved cable connecter of simple structure capable of being manufactured at low cost and preferably comprising relatively few parts, an object being to so design and construct the said connecter that the parts thereof may be cast and readily assembled after which they are ready for use without further expensive manufacturing operations. And likewise it is an object to produce a cable connecter which is simple and easy to insert in standard round knock-out holes of boxes in present-day use, and which connecter functions to positively anchor itself as well as pressing the cable wall into direct contact with the rim of the box hole thereby establishing good electric contact as well as a mechanical connection.

The accompanying drawing illustrates preferred forms of the invention, the structure of which may be suitably varied or modified without departing from the scope and principle of my invention.

Figure 1 illustrates a perspective view of an electric fixture box showing the connecter in anchored position joining a cable to the box.

Figure 2 illustrates an inside sectional view across the box showing the connecter from the inside of box, the said connecter being illustrated in end elevation.

Figure 3 shows a cross sectional view taken on the line 3—3 of the drawings.

Figure 4 illustrates a perspective disassembled view illustrating the structure of the two parts constituting my improved connecter.

Figure 5 illustrates the three major projections of the assembled connecter.

Figure 6 illustrates a slightly modified and improved form of connecter.

Referring now more particularly to the drawings for a more detailed description of the invention, there is shown a cable connecter constructed in the form of a sleeve 9 adapted to fit through a box wall and having a shoulder bushing 10 at one end and made open at the other end for the reception of the cable or conduit. The open end of the connecter is preferably provided with an abutment flange 11 which acts as an abutment surface to position and gauge the distance in which the said sleeve projects into the box when it is inserted in the knock-out hole thereof. The flange is integral with a part of the sleeve which extends through the box hole and is enlarged on one side of the cylinder sleeve 9 as shown at 12; and the enlarged portion is formed into a cylinder bore or cast opening 13. A stop or lug 14 is integrally made at the end of the bore 13. The said sleeve is provided with an opening in the nature of a cam receiving means and is designed to carry a movable jamming lock cam in a position flush with the internal and external cylinder surface of the sleeve 9. The said gapped opening 15 is formed co-extensive with the cylinder bore 13 and in fact becomes a part thereof, for the said bore 13 extends outwardly part way through the sleeve wall 9 thus making the opening 15 and bore 13 a continuous opening for the purpose hereinafter described. The said sleeve is provided with a wall entry or locking slot 16 cut through the wall thereof and extending part way through the sleeve, and the said slot acts as a knock-out box edge receiving means by which the connecter is rigidly anchored to the box, and by which the edge of the box hole extends into the connecter and pinches against the cable. This slot 16 is preferably formed adjacent the flange 11 and thus the said flange forms one wall of the locking slot and acts as an abutment plate to properly position the sleeve within a box.

A camming device or sleeve moving member embodying means for moving the sleeve laterally to lock it in the box is rotatably carried in the cylinder bore 13; and this device consists of a shaft part 19 having an integral handle 20 on one end and having an integral cam piece 21 on the other end. The shaft 19 is rotatably confined in the cylinder 13 with the handle 20 disposed in line with the lug 14 which limits the movement of the handle in one direction, and the cam piece 21 lies within the opening 15. The normal position of parts when the connecter is not in use is such that the handle 20 rests against the stop 14 while the cam 21 as to its flat surface is disposed flush with the external surface of the sleeve 9, and thus the position of the handle 20 and cam part 21 does not interfere with the insertion of the sleeve 9 within the knock-out hole of the box; and likewise the convex side of the cam 21 lies flush with the internal surface of the sleeve which permits a cable C to be slipped into position in the sleeve. The shaft, the cam, and the handle parts are all integrally cast; and after being assembled with the sleeve 9, the upper rim of the cylinder 13 may be burred over slightly to prevent the part 19 from falling out of the pocket or bore 13, and yet at the same time the cam and handle parts are allowed free rotation within the cylinder bore 13.

In the use of the cable connecter to fasten a cable to the box, the sleeve 9 is inserted in the knock-out H of the box B in the usual manner, and the cable end C is introduced into the sleeve at the same time, and the cable is brought to rest against the shoulder bushing 10 with the cable wires W drawn through the oval edged shoulder bushing 10 which protects the insulation of the wire while electrical connections are made. The locking slot 15 is brought into registry with the edge of the knock-out hole H which causes the flange 11 and sleeve 9 to embrace or receive the knock-out box rim, and it is now observed how the cable extends or lies across the sleeve slot 16 and how the rim of the box hole H is uncovered and exposed to direct contact with the cable wall inside the connecter. The mechanic now grasps the handle 20 with a wrench or pliers and gives it a substantially one-half turn which brings the cam piece 21 into a vertical position as shown in Figures 2 and 3; and the rounded edge of the cam part 21 cams against the knock-out edge H of the box thereby forcing laterally or radially the cable connecter 9 which causes the box edge to move with great force directly against the cable wall C thereby biting and clamping into the cable C to establish positive electrical contact between the box and cable and to simultaneously secure the cable to the connecter and the connecter to the box. This movement of parts sets up an eccentric relation between the box hole H and the sleeve 9 thereby causing a portion of the box hole rim H to move through the slot 29 and against the cable C which firmly establishes the slot 16 down over the rim of the box thereby positively anchoring the sleeve connecter 9 in the box knockout. The connecter is easily inserted and removed by rotating the handle 20 of the camming member. The cam 21 may be rotated to maximum pressing position so as to maintain a straight line position between the rim of the box hole and the center of the cable which prevents the cam from moving to a loosened position.

Figure 6 shows a modified form of the connecter which is made with a sleeve 23 on one end and an abutment plate or flange 24 is formed on the other end. The abutment or anchorage flange 24 is integrally joined to the sleeve by an extension which is merely a continuation of the sleeve which spaces said abutment from the end of the sleeve a distance equal to the thickness of a box wall. A shoulder bushing 25 is made on the other end of the sleeve and functions as a stop against which the cable C rests as well as providing an oval edged aperture through which the cable wires W are drawn to make an electric connection in the box. A locking screw 26 is made with a cone-shaped jam end 27, and the screw is carried in the rim of the abutment plate 24 and is adapted to travel along and within a circular depression 28 when the mechanic applies a wrench or pliers to forcibly turn the screw 26 and thus drive it through the plate 24. The cable connecter shown in Figure 6 operates quite similar to the one already described and it is inserted in the knock-out box hole H with its locking slot 29 lapping over or embracing the box edge. The screw 26 of course is screwed back or nearly out of the plate 24 in order that the said cone-shaped screw end 27 will not interfere against the box knock-out edge while inserting the connecter. After the connecter and cable end C are properly located in the box hole, the operator then turns the screw 26 forwardly which brings the cone-shaped end 27 forcibly against the knock-out edge H of the box thereby laterally or radially forcing the connecter sidewise with great force thereby pinching the edge of the box which by now has attained an eccentric position inside the connecter and presses against the cable through the slot 29 and simultaneously anchoring the cable and connecter in the box, and making direct electrical contact between the cable and box as well.

When the connecter shown in Figure 6 is forcibly slid sideways or laterally along the box wall to bring the box edge up through the locking slot 29, it is observed that the said sleeve 23 will be displaced from the center of the box hole H thereby tending to leave space between the knock-out box edge and sleeve, but such space is adequately covered over by virtue of the large spreading abutment plate 24. Thus the structure of the connecter adequately covers over and seals the box knock-out opening irrespective of the position of the sleeve connecter within the box. The connecter is made of few parts.

A significant feature of this connecter resides in the fact that the sleeve thereof is slightly smaller than the box hole H into which the sleeve is placed. Furthermore the slot in the sleeve admits the box edge into the inside of the sleeve. This characteristic interfitting arrangement simply means that the sleeve is received into the box hole and a portion of the box hole rim is received into the sleeve. Therefore the cable overlies that portion of the box hole rim which is in the sleeve and anchors itself thereto, while at the same time the sleeve anchors itself in the box by virtue of the sleeve slot having overlapped the box wall adjacent the hole. Therefore no screws or screw holes in the box are necessary by which to fasten the connecter to the box.

What I claim is:—

1. Cable and box connecting means comprising, a box provided with a hole, a connecter member of such size as will fit into said hole, said member including spaced means abutting the opposite box wall surfaces adjacent the hole to anchor the member in the box against longitudinal displacement and formed to expose a portion of the box hole edge directly to a cable placed therein, a rotatable member and means mounting said rotatable member on the connecter, and said cable and box connecting means and rotatable member including means cooperating with the connecter to grip a cable between the latter and said exposed box hole edge.

2. Cable and box connecting means comprising, a box provided with a hole, a connecter including a sleeve, said connecter being of such size as will permit it to fit into said box hole, said connecter including spaced means which abut the opposite box wall surfaces adjacent the hole to anchor the connecter in the box against longitudinal displacement and formed to expose a portion of said box hole edge directly to a cable placed in the box hole, a rotatable member and means mounting it in the connecter, and said box and rotatable member including means for moving said sleeve laterally relative in the hole to grip a cable between the sleeve and said exposed box hole edge.

3. Cable and box connecting means comprising, a box provided with a hole, a connecter member of such size as will fit into said hole, said connecter including spaced means abutting the opposite box wall surfaces adjacent the hole to anchor it in the box against longitudinal displacement and formed to expose a portion of the box hole edge directly to a cable placed in the box hole, a rotatable member and means mounting it in the connecter, and said rotatable member including an end so formed that when said member is turned it acts directly against the box hole edge to laterally move the connecter relatively to the box hole to grip a cable between the exposed box hole edge and connecter.

4. Cable and box connecting means comprising, a box provided with a hole, a connecter including a sleeve, said connecter being of such size as will permit it to fit into said box hole, said sleeve including a slot into which projects the box hole edge to anchor the sleeve in the box against displacement and to directly expose a portion of said box hole edge inside the sleeve to a cable placed in the sleeve, a rotatable member with means rotatably mounting it in the slotted sleeve, and said rotatable member including means which when turned acts against the box hole edge to force the sleeve laterally relative to the box hole to grip the cable between the sleeve and exposed box hole edge.

5. A cable connecter comprising a member of suitable size to fit into a box hole and formed to expose a portion of the box hole edge directly to a cable received thereinto and including spaced abutment means in between which a box hole edge rests to anchor the connecter against longitudinal displacement, and fastening means for said connecter and cable, including a rotatable member mounted in the connecter, to grip a cable between the member and exposed box hole edge and to simultaneously force said abutment means into anchored position.

6. A cable connecter as defined in claim 5 wherein one of the abutments is too large to pass through a box wall.

7. A cable connecter comprising a sleeve of suitable size to fit into a box hole and formed to expose a portion of the box hole edge directly to a cable received thereinto and including spaced abutments in between which a box hole edge rests to anchor the connecter against longitudinal displacement, and fastening means for said connecter and cable, including a rotatable member mounted in the connecter, to grip a cable between the sleeve and exposed box hole edge and to simultaneously force the abutments into anchored position.

8. A cable connecter as defined in claim 7 wherein one abutment is spaced from the sleeve end and said abutment being too large to pass through a box hole which places the sleeve on one side of a box wall and said large abutment on the other side thereof.

9. A cable connecter comprising a sleeve of suitable size to fit into a box hole and having a transverse slot through which projects the edge of a box hole to grip directly against a cable and to anchor itself within a box hole, and fastening means for said sleeve and cable, including a rotatable member mounted in the sleeve, to grip a cable between the connecter and said exposed box hole edge.

10. A cable connecter as defined in claim 9 wherein one side of the transverse slot is defined by abutment means on the sleeve end too large to pass through a box hole.

11. A cable connecter comprising a member of suitable size to fit part way into a box hole and formed to expose a portion of the box hole edge directly to a cable received thereinto and including spaced abutment means in between which a box hole edge rests to anchor the connecter against longitudinal displacement, one of the abutments being too large to fit through a box hole, fastening means for said connecter and cable including a rotatable part mounted in the connecter, to grip a cable between it and the exposed box hole edge and to simultaneously force said abutment means into anchored position, and tool receiving means on the rotatable part outside the large size abutment.

12. A cable connecter comprising, a connecter small enough to fit into a box hole and leave exposed a portion of the box hole edge, spaced abutment means included on the connecter between which a box hole edge is adapted to rest, a rotatable member and means mounting it on the connecter, and said rotatable member including means which when the connecter is in position in the hole, coacts with a box portion to move the connecter laterally with respect to the box hole to grip a cable between the connecter and an exposed box hole edge.

13. A cable connecter comprising, a sleeve, abutment means formed on the sleeve and spaced from the end thereof and defining with it a box hole edge entry slot, a rotatable sleeve moving member and means rotatably mounting it in the sleeve, said rotatable member including means which, when the connecter is in position in a box hole, coacts with a box portion to move the sleeve laterally relative with respect to the box hole to grip a cable between the sleeve and exposed box hole edge.

14. A cable connecter comprising, a sleeve including a box hole edge entry slot, abutment means on the sleeve spaced from said sleeve end forming one side of the transverse slot aforesaid, and a rotatable member mounted in the abutment means, said rotatable member and sleeve including means, which when the connecter is in position in a box hole, coacts with a box portion to laterally move the sleeve by which the slot is forced over a box hole edge to grip a cable between the sleeve and said edge.

15. A cable connecter comprising, a sleeve having a box hole edge entry slot, abutment means on the sleeve spaced from the end thereof defining one side of the slot, a rotatable member mounted in the connecter opposite the slot, a tool receiving means on one end of the rotatable member, and said rotatable member including means made on the other end thereof adapted to engage a box hole edge to laterally move the sleeve relatively to the box hole.

16. A cable connecter comprising, a sleeve having a box hole edge entry slot, abutment means on the sleeve spaced from the end thereof defining one side of the slot, a member rotatably mounted in the abutment means opposite said slot and including an engaging portion in position to react against a box hole edge to laterally move the connecter with respect to the box hole, and said member also being provided with tool receiving means by which the engaging portion is rotated.

17. A cable connecter adapted to simultaneously anchor itself in a box hole and fasten a cable therein comprising, a sleeve adapted to rest with its end against one side of a box wall eccentric to said hole to expose the box hole edge directly to a cable in said sleeve, an abutment spaced from one end of the sleeve adapted to bear on the other side of a box wall, a cam and means rotatably mounting it in the abutment, said cam being adapted to work against a box hole edge to move the sleeve laterally, and a tool head made on the cam by which it is rotated.

18. A cable connecter comprising a member of suitable size to fit into a box hole and formed to expose a portion of the box hole edge directly to a cable received therein, and including spaced means, by which the connecter is guided and retained in a box hole, while said means move in relation to said box hole edge, and a rotatable device mounted in the member and the end of said device being adapted to turn against and react from a box hole edge to grip a cable between the member and exposed box hole edge and to simultaneously force said spaced means into anchored position.

19. A cable connecter comprising a sleeve of suitable size to fit into a box hole and formed to expose a portion of the box hole edge directly to a cable received thereinto, and including spaced means, by which the connecter is guided and retained in a box hole, while said means move in relation to said box hole edge, and an operating device to impart motion to the sleeve and spaced means, including a rotatable member mounted in the connecter adapted to bear directly against the box hole edge, to grip a cable between the sleeve and exposed box hole edge and to simultaneously force the spaced means over the box hole edge and firmly seat the sleeve in the box hole.

20. A cable connecter comprising a sleeve of suitable size to fit into a box hole and having a transverse slot through which projects the edge of a box hole to grip directly against a cable and to anchor itself within a box hole, and a rotatable member mounted in the sleeve adapted to turn against and react from the box hole edge to grip a cable between the connecter and said exposed box hole edge.

21. A cable connecter comprising a member of suitable size to fit part way into a box hole and formed to expose a portion of the box hole edge directly to a cable received thereinto, and including spaced means in between which a box hole edge is retained with the spaced means movable in relation to the box, one of the abutments being too large to fit through a box hole, a rotatable part mounted in the connecter and adapted to turn against and react from the box hole edge to move the connecter laterally relative in the box hole to grip a cable between it and the exposed box hole edge and to simultaneously force said spaced means over a box hole edge.

22. A connecter comprising a member suitable in size to fit into a box hole and formed to leave exposed a portion of said box hole edge directly to a cable placed therein, said connecter also comprising means to anchor the member in the box hole and to simultaneously cause it to grip a cable against said exposed box hole edge and including a device rotatably carried on the member and which rotatable device is adapted to move directly against the edge of the box hole and react therefrom to forcibly move said member laterally with respect to the box hole axis to grip a cable between the member and the exposed box hole edge.

23. A connecter comprising a member suitable in size to fit into a box hole and formed to leave exposed a portion of said box hole edge directly to a cable placed therein, said connecter also comprising means to anchor the member in the box hole and to simultaneously cause it to grip a cable against said exposed box hole edge and including a device rotatably carried on the member, and said device having an end portion adapted to engage against and react from a box portion at the edge of said box hole to forcibly move said member laterally with respect to the box hole axis to grip a cable between the member and the exposed box hole edge.

In testimony whereof I affix my signature this 26th day of Sept. 1923.

HERMAN L. STRONGSON.